United States Patent
Okamatsu

(10) Patent No.: US 9,447,212 B2
(45) Date of Patent: Sep. 20, 2016

(54) PRODUCTION METHOD FOR VINYL ETHER POLYMER

(71) Applicant: The Yokohama Rubber Co., LTD., Minato-ku, Tokyo (JP)

(72) Inventor: Takahiro Okamatsu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/773,693

(22) PCT Filed: Mar. 7, 2014

(86) PCT No.: PCT/JP2014/056011
§ 371 (c)(1),
(2) Date: Sep. 8, 2015

(87) PCT Pub. No.: WO2014/136948
PCT Pub. Date: Sep. 12, 2014

(65) Prior Publication Data
US 2016/0046743 A1 Feb. 18, 2016

(30) Foreign Application Priority Data

Mar. 8, 2013 (JP) .................................. 2013-046260

(51) Int. Cl.

| | | |
|---|---|---|
| C08F 2/00 | (2006.01) | |
| C08F 116/20 | (2006.01) | |
| C08F 2/04 | (2006.01) | |
| C08F 116/14 | (2006.01) | |
| C08F 216/14 | (2006.01) | |

(52) U.S. Cl.
CPC ............. C08F 116/20 (2013.01); C08F 2/04 (2013.01); C08F 116/14 (2013.01); C08F 216/1416 (2013.01)

(58) Field of Classification Search
CPC ........ C08F 16/12; C08F 2/04; C08F 116/20; C08F 216/14; C08F 116/14; C08F 216/1416
USPC .................................................. 526/208, 212
See application file for complete search history.

(56) References Cited

U.S. PATENT DOCUMENTS

| | | | |
|---|---|---|---|
| 5,576,407 A | 11/1996 | Kroner et al. | |
| 2001/0047059 A1* | 11/2001 | Hitomi | C08F 265/06 525/312 |

FOREIGN PATENT DOCUMENTS

| | | |
|---|---|---|
| DE | 603 16 941 | 7/2008 |
| JP | H06-511021 | 12/1994 |
| JP | H11-080221 | 3/1999 |
| JP | H11-279287 | 10/1999 |
| JP | 2005-187703 | 7/2005 |
| JP | 2007-099881 | 4/2007 |
| JP | 2008-303315 | 12/2008 |
| WO | WO 93/06142 | 4/1993 |
| WO | WO 03/104294 | 12/2003 |

OTHER PUBLICATIONS

International Search Report for International Application No. PCT/JP2014/056011 dated Jun. 10, 2014, 2 pages, Japan.

* cited by examiner

*Primary Examiner* — William Cheung
(74) *Attorney, Agent, or Firm* — Thorpe North & Western

(57) ABSTRACT

The production method for a vinyl ether polymer of the present technology comprises the step of subjecting a vinyl ether monomer to radical polymerization in a mixed solvent to form a vinyl ether polymer. The mixed solvent is a mixed solvent in which the mass ratio of isopropyl alcohol to dimethylformamide is from 93:7 to 75:25, or a mixed solvent in which the mass ratio of isopropyl alcohol to water is from 50:50 to 5:95, and a mass ratio of the vinyl ether monomer to the mixed solvent is from 3:100 to 45:100.

6 Claims, No Drawings

PRODUCTION METHOD FOR VINYL ETHER POLYMER

This application is a U.S. National stage application of International Application No. PCT/JP2014/056011, filed Mar. 7, 2014, which claims claims priority to Japanese No. 2013-046260 filed on Mar. 8, 2013, the contents of each of which is hereby incorporated herein by reference.

TECHNICAL FIELD

The present technology relates to a production method for a vinyl ether polymer.

BACKGROUND

Conventionally, as a polymerization method for a polymer comprising a polyvinyl ether structure, a polymerization method by living cationic polymerization has been known (see, for example, Japanese Unexamined Patent Application Publication Nos. H11-080221A and 2007-099881).

The cationic polymerization described in Japanese Unexamined Patent Application Publication Nos. H11-080221A and 2007-099881 and the like generally requires effort to adjust reaction conditions (particularly, temperature conditions), and is known to have problems such as expensive catalysts and difficult preparation in water-based media.

SUMMARY

The present technology provides a production method for a vinyl ether polymer using radical polymerization without these problems.

The present inventor has conducted diligent studies in order to solve the above problems and consequently completed the present technology by finding that using a specific mixed solvent with a vinyl ether monomer at a specific mass ratio enables polymerization by radical polymerization which has been conventionally regarded as being extremely difficult, as a polymerization method for a vinyl ether monomer.

That is, the present inventor has found that the above problems can be solved by the following configuration.

(1) A production method for a vinyl ether polymer using a vinyl ether monomer, the method comprising the step of subjecting a vinyl ether monomer to radical polymerization in a mixed solvent to form a vinyl ether polymer;

the above mixed solvent being a mixed solvent in which a mass ratio of isopropyl alcohol to dimethylformamide is from 93:7 to 75:25, or a mixed solvent in which a mass ratio of isopropyl alcohol to water is from 50:50 to 5:95; and a mass ratio of the above vinyl ether monomer to the above mixed solvent being from 3:100 to 45:100.

(2) The production method for a vinyl ether polymer according to the above (1), wherein the above vinyl ether monomer is a compound represented by any one of the following formulae (1) to (4):

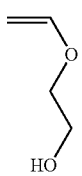
(1)

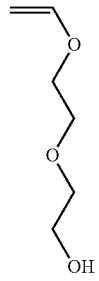
(2)

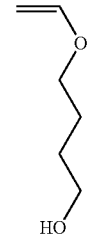
(3)

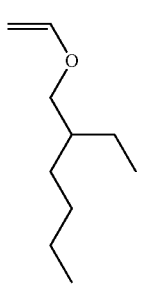
(4)

(3) The production method for a vinyl ether polymer according to the above (1) or (2), wherein the polymerization initiator used in the above radical polymerization is an azo or peroxide initiator.

(4) The production method for a vinyl ether polymer according to the above (3), wherein the 10-hour half-life temperature of the above polymerization initiator is 100° C. or lower.

As described below, the present technology can provide a production method for a vinyl ether polymer using radical polymerization.

Here, since a polymerization method by radical polymerization is generally a mechanism in which radicals are generated using a polymerization initiator, which cleaves a monomer double bond, thereby causing the occurrence of a reaction between monomers, there exists no ionic group in functional groups associated with polymerization. Therefore, polymerization will not be inhibited even in a medium having an ionic group such as water or alcohol, which eliminates the need to remove impurities and the like having a polarity from the monomer, medium and initiator. Hence, the radical polymerization has none of the problems described above involving cationic polymerization.

DETAILED DESCRIPTION

The production method for a vinyl ether polymer of the present technology (hereinafter, also called "production method of the present technology") is a method in which a vinyl ether monomer made to be present in a specific mixed solvent described later at a specific mass ratio is subjected to radical polymerization to form a vinyl ether polymer.

In the present technology, as described above, using a specific mixed solvent with a vinyl ether monomer at a specific mass ratio enables polymerization by radical polymerization which has been conventionally regarded as being extremely difficult, as a polymerization method for a vinyl ether monomer.

This is not apparent in detail, but is thought to be the reason that using a specific solvent at a specific mass ratio allowed a state in which radicals were likely to be generated in the vinyl ether.

This is presumed from the fact that, as shown in Comparative Examples described later, in the case of using a single solvent, polymerization does not progress.

Hereinafter, a mixed solvent, a vinyl ether monomer and ratios thereof, which are used in radical polymerization, and a vinyl ether polymer that is produced will be described in detail.

<Mixed Solvent>

The mixed solvent used in the production method of the present technology is a mixed solvent (hereinafter, also called "mixed solvent (IPA/DMF)" in short) in which the mass ratio of isopropyl alcohol (hereinafter, also called "IPA" in short) to dimethylformamide (hereinafter, also called "DMF" in short) is from 93:7 to 75:25, or a mixed solvent (hereinafter, also called "mixed solvent "IPA/water" in short) in which the mass ratio of IPA to water is from 50:50 to 5:95.

Using such a mixed solvent at a specific ratio enables polymerization by radical polymerization which has been conventionally regarded as being extremely difficult, as a polymerization method for a vinyl ether monomer.

In addition, as shown in the tables (particularly, Blending Examples of Table 2) of "Working Examples" described later, it is found that since the molecular weight of a vinyl ether polymer that is produced is extremely low in mixed solvents (for example, Blending Examples 24, 30, 35, 40, and the like) in which the mass ratio is slightly off, the radical polymerization does not progress, and that there exists critical significance in the mass ratio (mixing ratio) of the solvents in the mixed solvents.

In the present technology, from the viewpoint of reducing a blending error in a mixed solvent, the mass ratio of IPA to DMF in the mixed solvent (IPA/DMF) is preferably from 90:10 to 75:25.

From a similar viewpoint, the mass ratio of IPA to water in the mixed solvent (IPA/water) is preferably from 50:50 to 10:90.

<Vinyl Ether Monomer>

The vinyl ether monomer used in the production method of the present technology is not particularly limited as long as the monomer is a compound having a $CH_2=CH-O-$ backbone (vinyl ether group).

Specifically, as the above vinyl ether monomer, it is preferred to use, for example, a compound represented by any one of the following formulae (1) to (4).

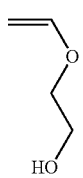
(1)

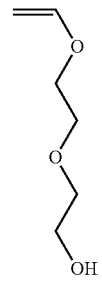
(2)

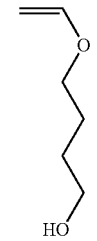
(3)

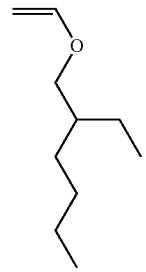
(4)

<Ratio of Mixed Solvent to Vinyl Ether Monomer>

In the production method of the present technology, the above-mentioned vinyl ether monomer and mixed solvent are used at a mass ratio such that vinyl ether monomer: mixed solvent is from 3:100 to 45:100.

Using these at the above mass ratio enables polymerization by radical polymerization which has been conventionally regarded as being extremely difficult, as a polymerization method for a vinyl ether monomer.

As shown in the tables (particularly, Blending Examples of Table 1) of "Working Examples" described later, it is found that since in Blending Examples 2, 9, 12 and 20 in which the mass ratio is slightly off, the molecular weight of a vinyl ether polymer that is produced is extremely low, the radical polymerization does not progress, and that there exists critical significance in the mass ratio (blending ratio) of the vinyl ether monomer to the mixed solvent.

In the present technology, from the viewpoint of reducing a mixing error in a monomer, the mass ratio of the vinyl ether monomer to the mixed solvent is preferably from 10:100 to 45:100.

<Vinyl Ether Polymer>

Polymerization conditions of the radical polymerization in the production method of the present technology are not particularly limited except for the conditions of the above-mentioned mixed solvent and the like, and may adopt conventionally known polymerization conditions of radical polymerization as appropriate.

Polymerization Initiator

A polymerization initiator used in radical polymerization is not particularly limited, and a conventionally known azo or peroxide initiator can be used.

Specifically, for example, an azo polymerization initiator such as dimethyl-2,2'-azobisisobutylate, 2,2'-azobisisobutyronitrile (hereinafter, also called "AIBN" in short), or 2,2'-azobis(2,4-dimethylvaleronitrile); a peroxide polymerization initiator such as lauryl peroxide, benzoyl peroxide (hereinafter, also called "BPO" in short), 2,2',4,4'-tetrahydroxy benzoyl peroxide (hereinafter, also called "THBPO" in short), or tert-butyl peroctoate; and a persulfide initiator such as potassium persulfate can be used.

Among these examples, from the reason that it is desirable that polymerization temperature is within an easily controllable range, using a polymerization initiator, the 10-hour half-life temperature of which is 100° C. or lower is preferable, and specifically, using AIBN (10-hour half-life temperature: 75° C.), BOP (10-hour half-life temperature: 80° C.) and THBPO (10-hour half-life temperature: 80° C.) is more preferable.

Further, as other polymerization initiators used in radical polymerization (particularly, living radical polymerization), conventionally known polymerization initiators for an atom transfer radical polymerization process may be appropriately used. Examples thereof include an organic halide, such as 1-phenylethyl chloride, 1-phenylethyl bromide, chloroform, carbon tetrachloride, 2-bromopropionitrile, 2-chloropropionic acid and a derivative thereof, 2-bromopropionate and a derivative thereof, 2-chloroisobutyric acid and a derivative thereof, or 2-bromoisobutyric acid and a derivative thereof.

Among these examples, from the viewpoint of efficiency of polymerization initiation, an organic halide in which a halogen atom is bound to a tertiary carbon atom is preferable, 2-bromoisobutyrate ester is more preferable, and ethyl 2-bromoisobutyrate (EBIB) is even more preferable.

In the present technology, the amount of the above polymerization initiator is not particularly limited, but is approximately from 0.005 to 0.5 parts by mass per 100 parts by mass of the above vinyl ether monomer, and is preferably from 0.005 to 0.05 parts by mass.

Radical Temperature and the Like

The polymerization temperature and the like of radical polymerization is not limited, and, for example, the radical polymerization can be allowed to proceed by a reaction under conditions of from 70 to 100° C. for from 2 to 10 hours.

Molecular Weight

The weight average molecular weight (Mw) of a vinyl ether polymer produced by the production method of the present technology is not particularly limited because of being different depending on the kind of the above-mentioned vinyl ether monomer and mixed solvent, and these mass ratios, but is approximately from 10,000 to 80,000.

Similarly, molecular weight distribution (Mw/Mn) serving as the ratio of weight average molecular weight (Mw) to number average molecular weight (Mn) is not particularly limited, but is approximately from 1.1 to 3.0.

Here, both the weight average molecular weight and the number average molecular weight are measured by gel permeation chromatography (GPC) in terms of standard polystyrene conversion.

<Monovalent Copper Complex>

In the present technology, a monovalent copper complex is preferably used at the time of radical polymerization (particularly, living radical polymerization).

Here, the above copper complex comprises a monovalent copper compound which generates radicals from the above polymerization initiator, and a ligand which is coordinated to the above copper compound to dissolve the above copper compound in the above solvent.

For example, the above copper compound and the above ligand are added in the above solvent and stirred in advance before the above polymerization initiator is added in the above solvent to initiate polymerization, and the above copper complex can be deemed to be formed upon dissolution of the above copper compound.

Monovalent Copper Compound

Examples of the above copper compound include cuprous chloride, cuprous bromide, cuprous iodide, cuprous cyanide, cuprous oxide, and cuprous perchlorate, and cuprous chloride (CuCl (I)) and cuprous bromide (CuBr (I)) are preferable because of being low cost and easily available.

It should be noted that the amount of the above copper compound is not particularly limited, but is approximately from 0.001 to 0.07 parts by mass per 100 parts by mass of the above vinyl ether monomer, and is preferably from 0.002 to 0.05 parts by mass.

Ligand

The above ligand is not particularly limited, but may adopt, for example, a nitrogen-containing compound, particularly a chelate type nitrogen-containing compound. Specific examples thereof include triethylamine, tributylamine, 2,2'-bipyridyl and a derivative thereof, 1,10-phenanthroline and a derivative thereof, tetramethylethylenediamine, pentamethyldiethylenetriamine, hexamethyltris(2-aminoethyl)amine, and tris(2-(pyridyl) methyl)amine.

Among these examples, triethylamine represented by the following formula (5), and tetramethylethylenediamine represented by the following formula (6) are preferable due to the reason that a polymer having narrower molecular weight distribution can be obtained.

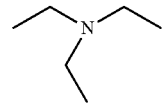

(5)

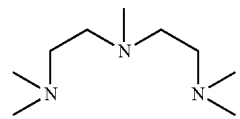

(6)

If the amount of the above ligand is too little, the molecular weight of obtainable polymers may become extremely low and polymerization may not proceed sufficiently. Thus, from the viewpoint of obtaining suitable molecular weight of polymers, the amount thereof is preferably 2 or more moles per 1 mole of copper (I) in the above copper compound, and is more preferably 2.5 or more moles.

It should be noted that the upper limit of the amount of the above ligand is not particularly limited, but is preferably 10 or less moles per 1 mole of copper (I) in the above copper compound.

<Ascorbic Acid>

In the present technology, ascorbic acid is preferably used together with the above copper complex at the time of radical polymerization (particularly, living radical polymerization).

The above ascorbic acid is a reducing agent used in combination with the above copper complex, and reduces the copper complex in a high oxidation state in the above solvent into a low oxidation state.

In the production method of the present technology, the above ascorbic acid is preferably used in the amount such that the molar ratio of copper (I) in the above copper compound to the above ascorbic acid is from 1:0.5 to 1:2.

Using the above ascorbic acid at the above molar ratio makes it possible to obtain a vinyl ether polymer having narrow molecular weight distribution by radical polymerization which has been conventionally regarded as being extremely difficult, as the polymerization method of a vinyl ether monomer.

In the present technology, the above molar ratio is more preferably from 1:0.5 to 1:1.5 from the viewpoint of reduction effects and economic efficiency.

EXAMPLES

Hereinafter, the production method of the present technology will be described in detail using examples. However, the present technology is not limited to these examples.

Blending Examples 1 to 55

The monomers, solvents and initiators shown in the following tables were blended so as to reach the composition ratio (part by mass, and described later, ascorbic acid and ligand are "molar ratio") shown in the same tables, and these were subjected to a reaction (radical polymerization) at 85° C. for 10 hours to form a polymer.

Specifically, the monomers and solvents shown in the same table were put in a Schlenk flask, and deaeration with nitrogen was carried out for 30 minutes. It should be noted that, in Blending Example 55, the copper compound and ligand shown in the same table after deaeration were mixed, added in the above Schlenk flask, and then stirred for approximately 1 hour until the copper compound was dissolved.

Subsequently, the initiator (in Blending Example 55, the initiator and ascorbic acid) shown in the same table was added and sealed, followed by putting the Schlenk flask in an oil bath set to 85° C. to initiate radical polymerization.

After 10 hours, the Schlenk flask was removed, methanol was excessively added, and radical polymerization reaction was brought to a stop.

Thereafter, the polymer that was formed was subjected to reprecipitation treatment using methanol, dried, and purified.

It should be noted that the weight average molecular weight (Mw) and molecular weight distribution (Mw/Mn) of the purified polymer are shown in the same table, but when the weight average molecular weight (Mw) was as low as less than 1000, and polymerization did not progress, molecular weight distribution is described as the sign "-".

In addition, "the molar ratio" of the ascorbic acid in the following Table 4 indicates the blending amount of the ascorbic acid converted into a molar ratio to 1 mole of copper (I) of the copper compound in the same table.

Similarly, the "molar ratio" of the ligand indicates the blending amount of the ligand converted into a molar ratio to 1 mole of copper (I) of the copper compound in the same table.

TABLE 1

<Mass ratio(monomer: mixed solvent)>

| | | Blending Examples | | | | |
|---|---|---|---|---|---|---|
| | | 1 | 2 | 3 | 4 | 5 |
| | | Comparative Example | | | Working Example | |
| Monomer | HEVE | 1 | 2 | 3 | 5 | 10 |
| | DEGV | | | | | |
| | HBVE | | | | | |
| | EHVE | | | | | |
| | MMA | | | | | |
| Solvent | IPA | 90 | ← | ← | ← | ← |
| | DMF | 10 | ← | ← | ← | ← |
| Initiator | AIBN | 0.001 | ← | ← | ← | ← |
| Molecular weight (Mw) | | 200 | 690 | 12100 | 18950 | 25620 |
| Molecular weight distribution (Mw/Mn) | | — | — | 2.01 | 2.22 | 2.06 |

| | | Blending Examples | | | | |
|---|---|---|---|---|---|---|
| | | 6 | 7 | 8 | 9 | 10 |
| | | Working Example | | | | Comparative Example |
| Monomer | HEVE | 20 | 35 | 40 | 45 | |
| | DEGV | | | | | |
| | HBVE | | | | | |
| | EHVE | | | | | |
| | MMA | | | | | 10 |
| Solvent | IPA | ← | ← | ← | ← | ← |
| | DMF | ← | ← | ← | ← | ← |
| Initiator | AIBN | 0.005 | ← | ← | ← | 0.001 |
| Molecular weight (Mw) | | 18940 | 33490 | 40200 | 550 | 120000 |
| Molecular weight distribution (Mw/Mn) | | 1.82 | 2.41 | 1.9 | — | 2.66 |

TABLE 1-continued

<Mass ratio(monomer: mixed solvent)>

| | | Blending Examples | | | | |
|---|---|---|---|---|---|---|
| | | 11 | 12 | 13 | 14 | 15 |
| | | Comparative Example | | | Working Example | |
| Monomer | HEVE | | | | | |
| | DEGV | 1 | 2 | 3 | 5 | 10 |
| | HBVE | | | | | |
| | EHVE | | | | | |
| | MMA | | | | | |
| Solvent | IPA | 90 | ← | ← | ← | ← |
| | DMF | 10 | ← | ← | ← | ← |
| Initiator | AIBN | | | | | |
| | THBPO | 0.005 | ← | ← | ← | ← |
| Molecular weight (Mw) | | 245 | 330 | 23200 | 31700 | 54990 |
| Molecular weight distribution (Mw/Mn) | | — | — | 2.45 | 2.71 | 2.67 |

| | | Blending Examples | | | | | |
|---|---|---|---|---|---|---|---|
| | | 16 | 17 | 18 | 19 | 20 | 21 |
| | | | Working Example | | | Comparative Example | |
| Monomer | HEVE | | | | | | |
| | DEGV | 20 | 35 | 40 | 45 | 50 | |
| | HBVE | | | | | | |
| | EHVE | | | | | | |
| | MMA | | | | | | 10 |
| Solvent | IPA | ← | ← | ← | ← | ← | ← |
| | DMF | ← | ← | ← | ← | ← | ← |
| Initiator | AIBN | | | | | | |
| | THBPO | 0.01 | ← | ← | ← | ← | ← |
| Molecular weight (Mw) | | 55500 | 71110 | 76810 | 12450 | 150 | 150 |
| Molecular weight distribution (Mw/Mn) | | 2.59 | 2.15 | 2.55 | 1.34 | — | — |

TABLE 2

<Solvent mixing ratio>

| | | Blending Examples | | | | |
|---|---|---|---|---|---|---|
| | | 22 | 23 | 24 | 25 | 26 |
| | | Comparative Example | | | Working Example | |
| Monomer | HEVE | | | | | |
| | DEGV | | | | | |
| | HBVE | 10 | ← | ← | ← | ← |
| | EHVE | | | | | |
| | MMA | | | | | |
| Solvent | IPA | 100 | 97 | 95 | 93 | 91 |
| | DMF | 0 | 3 | 5 | 7 | 9 |
| Initiator | AIBN | 0.005 | ← | ← | ← | ← |
| | THBPO | | | | | |
| Molecular weight (Mw) | | 100 | 250 | 240 | 45330 | 50000 |
| Molecular weight distribution (Mw/Mn) | | — | — | — | 2.63 | 2.44 |

| | | Blending Examples | | | | | |
|---|---|---|---|---|---|---|---|
| | | 27 | 28 | 29 | 30 | 31 | 32 |
| | | | Working Example | | | Comparative Example | |
| Monomer | HEVE | | | | | | |
| | DEGV | | | | | | |
| | HBVE | ← | ← | ← | ← | ← | ← |
| | EHVE | | | | | | |
| | MMA | | | | | | |
| Solvent | IPA | 90 | 80 | 75 | 72 | 60 | 50 |
| | DMF | 10 | 20 | 25 | 28 | 40 | 50 |

TABLE 2-continued

| | | <Solvent mixing ratio> | | | | | |
|---|---|---|---|---|---|---|---|
| Initiator | AIBN | ← | ← | ← | ← | ← | ← |
| | THBPO | | | | | | |
| Molecular weight (Mw) | | 46210 | 40790 | 49990 | 720 | 890 | 560 |
| Molecular weight distribution (Mw/Mn) | | 2.8 | 2.54 | 2.77 | — | — | — |

| | | Blending Examples | | | | |
|---|---|---|---|---|---|---|
| | | 33 | 34 | 35 | 36 | 37 |
| | | Comparative Example | | | Working Example | |
| Monomer | HEVE | | | | | |
| | DEGV | | | | | |
| | HBVE | | | | | |
| | EHVE | 10 | ← | ← | ← | ← |
| | MMA | | | | | |
| Solvent | IPA | 100 | 60 | 52 | 50 | 40 |
| | DMF | | | | | |
| | Water | 0 | 40 | 48 | 50 | 60 |
| Initiator | AIBN | | | | | |
| | THBPO | 0.005 | ← | ← | ← | ← |
| Molecular weight (Mw) | | 250 | 250 | 200 | 24400 | 20500 |
| Molecular weight distribution (Mw/Mn) | | — | — | — | 2.55 | 2.1 |

| | | Blending Examples | | | | | |
|---|---|---|---|---|---|---|---|
| | | 38 | 39 | 40 | 41 | 42 | 43 |
| | | Working Example | | Comparative Example | | | |
| Monomer | HEVE | | | | | | |
| | DEGV | | | | | | |
| | HBVE | | | | | | |
| | EHVE | ← | ← | ← | ← | ← | ← |
| | MMA | | | | | | |
| Solvent | IPA | 10 | 5 | 4 | 3 | 2 | 0 |
| | DMF | | | | | | |
| | Water | 90 | 95 | 96 | 97 | 98 | 100 |
| Initiator | AIBN | | | | | | |
| | THBPO | ← | ← | ← | ← | ← | ← |
| Molecular weight (Mw) | | 27300 | 25000 | 950 | 630 | 660 | 600 |
| Molecular weight distribution (Mw/Mn) | | 2.28 | 2.16 | — | — | — | — |

TABLE 3

| | | <Other solvent species> | | | | | |
|---|---|---|---|---|---|---|---|
| | | Blending Examples | | | | | |
| | | 44 | 45 | 46 | 47 | 48 | 49 |
| | | | | Comparative Example | | | |
| Monomer | HEVE | | | | | | |
| | DEGV | 5 | ← | ← | ← | ← | ← |
| | HBVE | | | | | | |
| | EHVE | | | | | | |
| | MMA | | | | | | |
| Solvent | IPA | | | | | | |
| | DMF | | | | | | |
| | Water | | | | | | |
| | Toluene | 100 | | | | | |
| | MEK | | 100 | | | | |
| | Ethyl acetate | | | 100 | | | |
| | Methanol | | | | 100 | | 50 |
| | Ethanol | | | | | 100 | 50 |
| Initiator | AIBN | 0.005 | ← | | ← | 0.005 | |
| | THBPO | | | 0.005 | | | 0.005 |
| Molecular weight (Mw) | | 250 | 450 | 250 | 220 | 250 | 240 |
| Molecular weight distribution (Mw/Mn) | | — | — | — | — | — | — |

TABLE 3-continued

<Other solvent species>

| | | Blending Examples | | | | |
|---|---|---|---|---|---|---|
| | | 50 | 51 | 52 | 53 | 54 |
| | | | | Comparative Example | | |
| Monomer | HEVE | | | | | |
| | DEGV | ← | ← | ← | ← | ← |
| | HBVE | | | | | |
| | EHVE | | | | | |
| | MMA | | | | | |
| Solvent | IPA | 50 | | | | |
| | DMF | | | | | |
| | Water | | 50 | | | |
| | Toluene | | | | 50 | |
| | MEK | | | 60 | | |
| | Ethyl acetate | | | 40 | | |
| | Methanol | | | | | |
| | Ethanol | 50 | 50 | | 50 | |
| Initiator | AIBN | 0.005 | | 0.005 | | |
| | THBPO | | 0.005 | | 0.005 | |
| Molecular weight (Mw) | | 170 | 240 | 380 | 310 | 290 |
| Molecular weight distribution (Mw/Mn) | | — | — | — | — | — |

TABLE 4

| | | Blending Examples 55 |
|---|---|---|
| | | Working Example |
| Monomer | EHVE | 10 |
| Solvent | IPA | 30 |
| | Water | 70 |
| Initiator | EBIB | 0.0025 |
| Copper compound | Copper chloride (I) | 0.0007 |
| Ascorbic acid (Molar ratio) | | 0.5 |
| Ligand (Molar ratio) | | 2.5 |
| Molecular weight (Mw) | | 17600 |
| Molecular weight distribution (Mw/Mn) | | 1.44 |

For the components in Table 1 to Table 4, the following were used.

Monomer: HEVE [vinyl ether monomer represented by the above formula (1), molecular weight: 74, produced by Wako Pure Chemical Industries, Ltd.]

Monomer: DEGV [vinyl ether monomer represented by the above formula (2), molecular weight: 132, produced by Wako Pure Chemical Industries, Ltd.]

Monomer: HBVE [vinyl ether monomer represented by the above formula (3), molecular weight: 116, produced by Wako Pure Chemical Industries, Ltd.]

Monomer: EHVE [vinyl ether monomer represented by the above formula (4), molecular weight: 156, produced by Wako Pure Chemical Industries, Ltd.]

Monomer: MMA [methyl methacrylate (acrylic monomer), molecular weight: 100, produced by Wako Pure Chemical Industries, Ltd.]

Solvent: IPA (Isopropyl alcohol)
Solvent: DMF (Dimethylformamide)
Solvent: Water
Solvent: Toluene
Solvent: MEK (Methyl ethyl ketone)
Solvent: Ethyl acetate
Solvent: Methanol
Solvent: Ethanol Initiator: AIBN (10-hour half-life temperature: 75° C.)
Initiator: THBPO (10-hour half-life temperature: 80° C.)
Initiator: EBIB (Ethyl 2-bromoisobutyate)
Copper compound: Copper chloride (I) [Cuprous chloride (CuCl (I))]
Ascorbic acid: Ascorbic acid
Ligand: Compound represented by the above formula (6)

From the results shown in Table 1, it was found that polymers obtained in Blending Examples 3 to 8 and Blending Examples 13 to 19, in which vinyl ether monomers were mixed to the mixed solvent (IPA/DMF) or the mixed solvent (IPA/water) at a specific mass ratio had significantly higher molecular weight than those of products obtained in Blending Examples 1, 2 and 9 and Blending Examples 11, 12 and 20, in which the mass ratios were off, and radical polymerization progressed. Note that it was confirmed that in Blending Examples 10 and 21, which used an acrylic monomer as a monomer, polymers were formed by radical polymerization.

Also, from the results shown in Table 2, it was found that polymers obtained in Blending Examples 25 to 29 and Blending Examples 36 to 39, which used mixed solvents constituted at a specific mixing ratio had significantly higher molecular weight than those of products obtained in Blending Examples 22 to 24 and 30 to 32 and Blending Examples 33 to 35 and 40 to 43, which used the mixed solvents in which the mixing ratio was off, and radical polymerization progressed.

Furthermore, from the results in Table 3, it was found that in Blending Examples 44 to 54 using other solvents, the molecular weight of products was low, and radical polymerization did not progress.

Moreover, from the results shown in Table 4, it was found that in Blending Example 55 in which polymerization was carried out using a copper compound, ligand and ascorbic acid, a vinyl ether polymer having narrow molecular weight distribution can be produced.

What is claimed is:

1. A production method for a vinyl ether polymer using a vinyl ether monomer, the method comprising the step of subjecting a vinyl ether monomer to radical polymerization in a mixed solvent to form a vinyl ether polymer;

the mixed solvent being a mixed solvent in which a mass ratio of isopropyl alcohol to dimethylformamide is from 93:7 to 75:25; and a mass ratio of the vinyl ether monomer to the mixed solvent being from 3:100 to 45:100.

2. The production method for a vinyl ether polymer according to claim 1, wherein the vinyl ether monomer is a compound represented by any one of the following formulae (1) to (4):

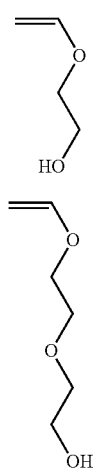

(1)

(2)

(3)

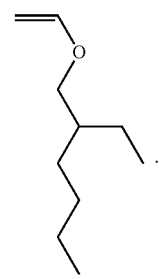

(4)

3. The production method for a vinyl ether polymer according to claim 1, wherein a polymerization initiator used in the radical polymerization is an azo or peroxide initiator.

4. The production method for a vinyl ether polymer according to claim 3, wherein a 10-hour half-life temperature of the polymerization initiator is 100° C. or lower.

5. The production method for a vinyl ether polymer according to claim 2, wherein a polymerization initiator used in the radical polymerization is an azo or peroxide initiator.

6. The production method for a vinyl ether polymer according to claim 5, wherein a 10-hour half-life temperature of the polymerization initiator is 100° C. or lower.

* * * * *